US006877200B2

(12) United States Patent
Villarreal

(10) Patent No.: US 6,877,200 B2
(45) Date of Patent: Apr. 12, 2005

(54) APPARATUS AND METHOD FOR VEHICLE TIRE REPAIR OR REPLACEMENT

(76) Inventor: Jesse Villarreal, 3027 Knight La., Baytown, TX (US) 77521

( * ) Notice: Subject to any disclaimer, the term of this patent is extended or adjusted under 35 U.S.C. 154(b) by 0 days.

(21) Appl. No.: 10/435,421

(22) Filed: May 9, 2003

(65) Prior Publication Data

US 2004/0221439 A1 Nov. 11, 2004

(51) Int. Cl.[7] ............................ B23P 19/04; B66F 3/24

(52) U.S. Cl. ............................ 29/402.08; 29/402.03; 29/426.1; 29/426.5; 29/428; 254/93 H; 152/416; 417/234

(58) Field of Search ......................... 29/402.01, 402.03, 29/402.08, 426.1, 426.5, 428, 402.1; 254/1, 93 H; 152/415, 416; 60/407; 417/234

(56) References Cited

U.S. PATENT DOCUMENTS

| | | | | |
|---|---|---|---|---|
| 3,831,901 A | * 8/1974 | Williams et al. | .......... | 254/93 R |
| 4,523,743 A | * 6/1985 | Wang | .......... | 254/93 H |
| 4,653,727 A | * 3/1987 | Chang et al. | .......... | 254/1 |
| 4,678,162 A | * 7/1987 | Yang | .......... | 254/8 B |
| 4,678,164 A | * 7/1987 | Yang | .......... | 254/93 H |
| 4,706,937 A | * 11/1987 | Chung | .......... | 254/93 H |
| 4,741,086 A | * 5/1988 | Orndorff, Jr. | .......... | 29/423 |
| 4,741,511 A | * 5/1988 | Yang | .......... | 254/93 H |
| 4,746,097 A | * 5/1988 | Chung et al. | .......... | 254/93 H |
| 4,775,132 A | * 10/1988 | Yang | .......... | 254/8 B |
| 4,833,746 A | * 5/1989 | Yong | .......... | 7/100 |
| 4,872,230 A | * 10/1989 | Levine | .......... | 7/100 |
| 4,925,158 A | * 5/1990 | Yang | .......... | 254/8 B |
| 4,948,107 A | * 8/1990 | Orndorff, Jr. | .......... | 254/93 HP |
| 5,211,375 A | * 5/1993 | Wang | .......... | 254/93 H |
| 5,441,237 A | * 8/1995 | Sweeney | .......... | 254/93 HP |
| 5,657,964 A | * 8/1997 | Yoshida | .......... | 254/126 |
| 5,722,641 A | * 3/1998 | Martin et al. | .......... | 254/423 |
| 5,765,810 A | * 6/1998 | Mattera | .......... | 254/423 |
| 5,876,526 A | * 3/1999 | Hamade et al. | .......... | 152/416 |
| 6,230,949 B1 | * 5/2001 | O'Connell et al. | .......... | 224/557 |
| 6,237,953 B1 | * 5/2001 | Farmer | .......... | 280/763.1 |
| 6,468,049 B1 | * 10/2002 | Hung | .......... | 417/234 |
| 6,626,423 B2 | * 9/2003 | Doswell | .......... | 254/93 H |
| 6,742,767 B1 | * 6/2004 | Bruzek | .......... | 254/93 H |
| 6,779,780 B2 | * 8/2004 | Arzouman | .......... | 254/8 B |
| 6,820,861 B2 | * 11/2004 | Bruzek | .......... | 254/93 H |

FOREIGN PATENT DOCUMENTS

| | | | | |
|---|---|---|---|---|
| GB | 2339852 A | * 2/2000 | .......... | B66F/3/35 |
| GB | 2376509 A | * 12/2002 | .......... | B66F/5/00 |
| WO | WO 03/047890 A1 | * 6/2003 | .......... | B60C/23/10 |

* cited by examiner

*Primary Examiner*—Essama Omgba
(74) *Attorney, Agent, or Firm*—The Matthews Firm

(57) ABSTRACT

An apparatus and method for operating a pneumatically actuated, hydraulic jack and an electric air compressor. The disclosed apparatus is self contained and portable and includes a pneumatically actuated hydraulic jack, an air compressor, at least one air supply line, and an electronic switch, for directing the air flow to either the jack or the air supply line. The air supply line can be used to inflate objects, such as tires, or used to power pneumatic tools. The air compressor is preferably powered by an automobile's electrical system and is thus adapted with a cigarette lighter adaptor. This apparatus is preferably used for changing vehicle tires and/or inflating the tires.

9 Claims, 3 Drawing Sheets

APPARATUS AND METHOD FOR VEHICLE TIRE REPAIR OR REPLACEMENT

AREA OF TECHNOLOGY

The present apparatus relates, generally, to portable tire changing systems. More particularly the present apparatus relates to a combined portable jack, compressor, and pneumatic tool attachment.

BACKGROUND OF INVENTION

Presently, the removal of one or more tires from a car can be accomplished by taking the car to a shop or doing the work individually. For an individual to change or repair a tire, the car must be raised up, usually by a jack, the lug nuts must be removed and then the tire can be removed. In most vehicles, the jack, either mechanical or hydraulic, is stored in the car. The typical automotive hydraulic jack is a small, usually cylindrical device. The typical jack, whether mechanical or hydraulic, is usually actuated by a handle in either an up-down motion or a circular motion. After removing a damaged tire a new tire or another tire is mounted in its place, the lug nuts are retightened, and the jack is lowered. The removal of the lug nuts can be problematic. Typically, an individual will use a "tire iron" or "tire tool" to loosen, remove, and retighten the lug nuts. The typical "tire iron" is either a metal bar or a four-ended cross bar. The metal bar type of "tire iron" is usually curved, approximately ninety degrees, at one end and has an integral socket which fits a typical lug nut; the other end is typically flat and pointed and can be used for prying, particularly for prying off a hub cap or other wheel cover. This type of "tire iron" has the inherent difficulty of maintaining a proper purchase on the lug nut thus frustrating the application of proper torque for breaking loose the lug nut and/or tightening it. This tool also creates an uneven exertion of a force against the automobile and thus the jack and could cause the jack to become unstable. The crossbar type of "tire iron" is usually a symmetrical cross bar which will have integral lug nut sockets, of different sizes, on 3 or 4 of the ends. If the cross bar tool only has three integral lug nut sockets, the fourth end usually has a flat pointed end for prying. Although the cross bar type of "tire iron" will allow a higher torque application to the lug nuts, it can also cause the jack to become unstable. Thus, a pneumatic wrench would be preferable for removing and attaching lug nuts. A further problem can involve a tire that is merely low on air or a spare tire that is low on air. The solution to this problem requires the use of an air compressor or air pump which can fill up the low or flat tire and if the tire must be changed a jack is also necessary. Thus, it would be desirable to provide an apparatus which could combine the functions of the jack, an air compressor, and a portable air wrench for loosening and/or tightening the lug nuts.

Currently, there are similar devices which are disclosed in other patents. However, there is no prior art that combines a jack, an air compressor, and a portable air wrench into one convenient and protable device. U.S. Pat. No. 6,230,949 discloses a hydraulic jack and a typical "tire iron" that is easily stowed in some vehicle compartment. However, this device does not disclose any air system or better tool for the removal and attachment of the lug nuts. This device can also sometimes be difficult to reach if the area around the designated jack storage area is packed with groceries, luggage, or other belongings. U.S. Pat. Nos. 5,722,641 and 5,876,526 both disclose hydraulic jacks which are attached to the vehicle and provide pnuematic power for a wrench or air for a tire. However, these devices are not portable and must be installed on a vehicle. This installation can be expensive and the jacks cannot be easily tranferred for use on other vehicles. U.S. Pat. No. 4,523,743 discloses an air actuated hydraulic jack. However, this device does not include any integral air supply nor does it provide any power for a pneumatic wrench. U.S. Pat. No. 4,706,937 discloses an air actuated hydraulic jack with a motor which provides power to operate two pistons. One of the pistons provides power to actuate the hydraulic jack and the other piston provides a compressed air supply. However, this device is rather complicated in that it involves various gears and pins to transmit force from the motor to the pistons. This arrangement provides for a variety of failure modes, in the gears and pins, as well as damage to the motor which hangs from the structure supported only by some coupling means at the motor output shaft. The '937 patent also makes no suggestion for the use of any air powered tools. The '973 patent does not teach to separate the jack function from the air compressing function thus both functions are performed at the same time. Another potential problem with most single hydraulic jacks is one of instability due to the small size of the jack and its bottom support. As described above, the typical portable automobile hydraulic jack is small and cylindrical in shape. Thus, it does not provide very much lateral support of the vehicle when it is jacked up. This is also the case for many mechanical jacks as well.

It is thus a desire to have a an apparatus which is portable and combines a jack, an air compressor, compressed air, to fill tires and power a pneumatic wrench, provides additional stability, and provides a control feature which directs air to either the jack or the air hose and/or pneumatic power hose.

BRIEF DESCRIPTION OF THE DRAWINGS

For a further understanding of the nature of the present device, reference should be had to the following detailed description, taken in conjunction with the accompanying drawings, in which like elements are given the same or analogous reference numbers and wherein.

DETAILED DESCRIPTION OF AN EMBODIMENT

Figure 1:
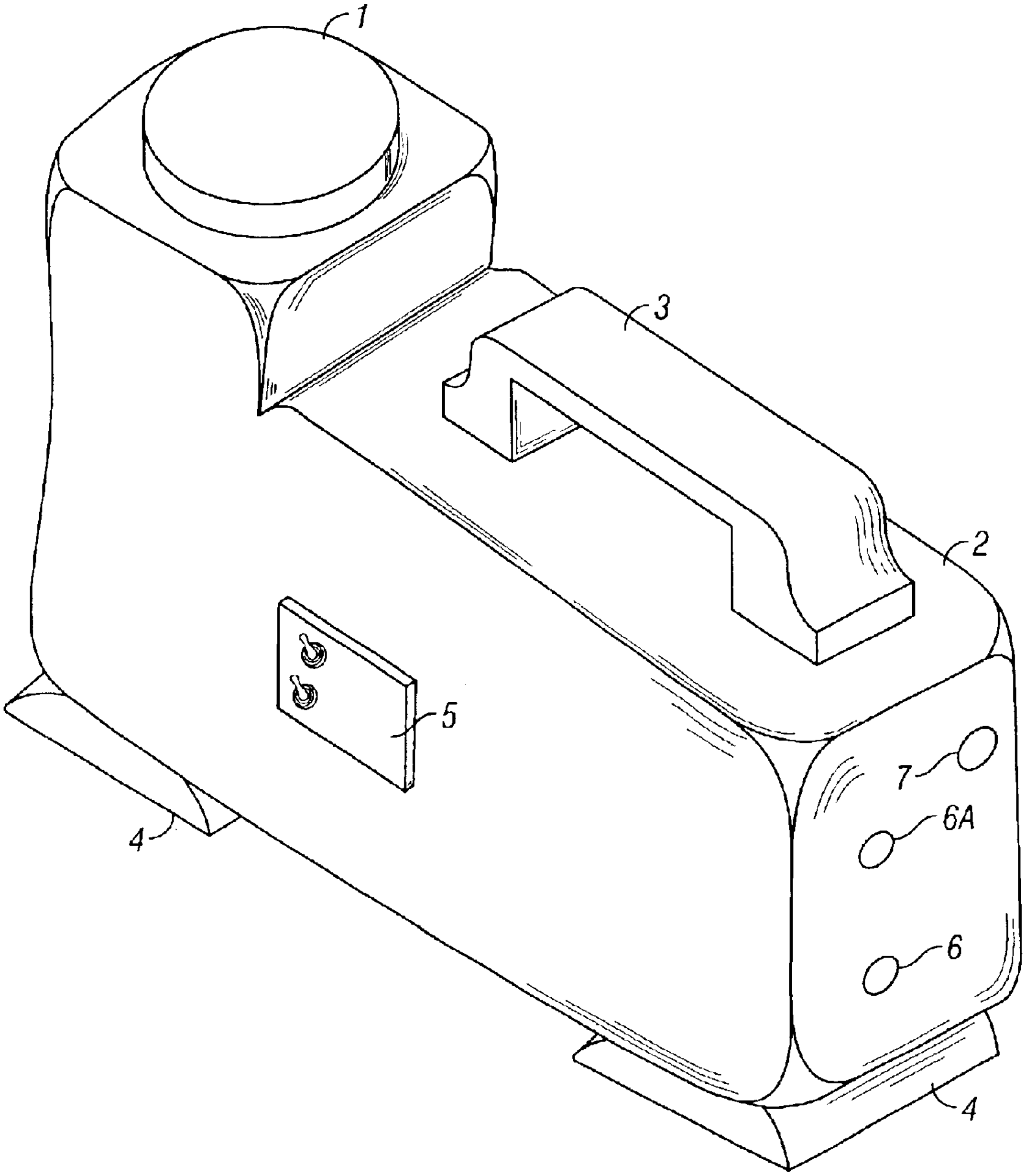
FIG. 1 is a pictorial view of a preferred form of the present apparatus 20.

FIG. 1 is an pictorial representation of an embodiment of the present apparatus. The device is enclosed in a self-contained housing (2). The portable self contained housing includes a carrying handle (3), supply air connections (6), **(6*a*), a 12 volt electrical connection (7), an electronic switch module (5), and bottom supports (4). It should be appreciated that although this embodiment describes two bottom supports (4) and two supply air outlet connections (6) (6*a*), this description is only intended to be representative. It is possible to have one or more bottom supports (4) of varying size. It is also possible to have only one supply air connection (6)** or several such connections.

Figure 2:
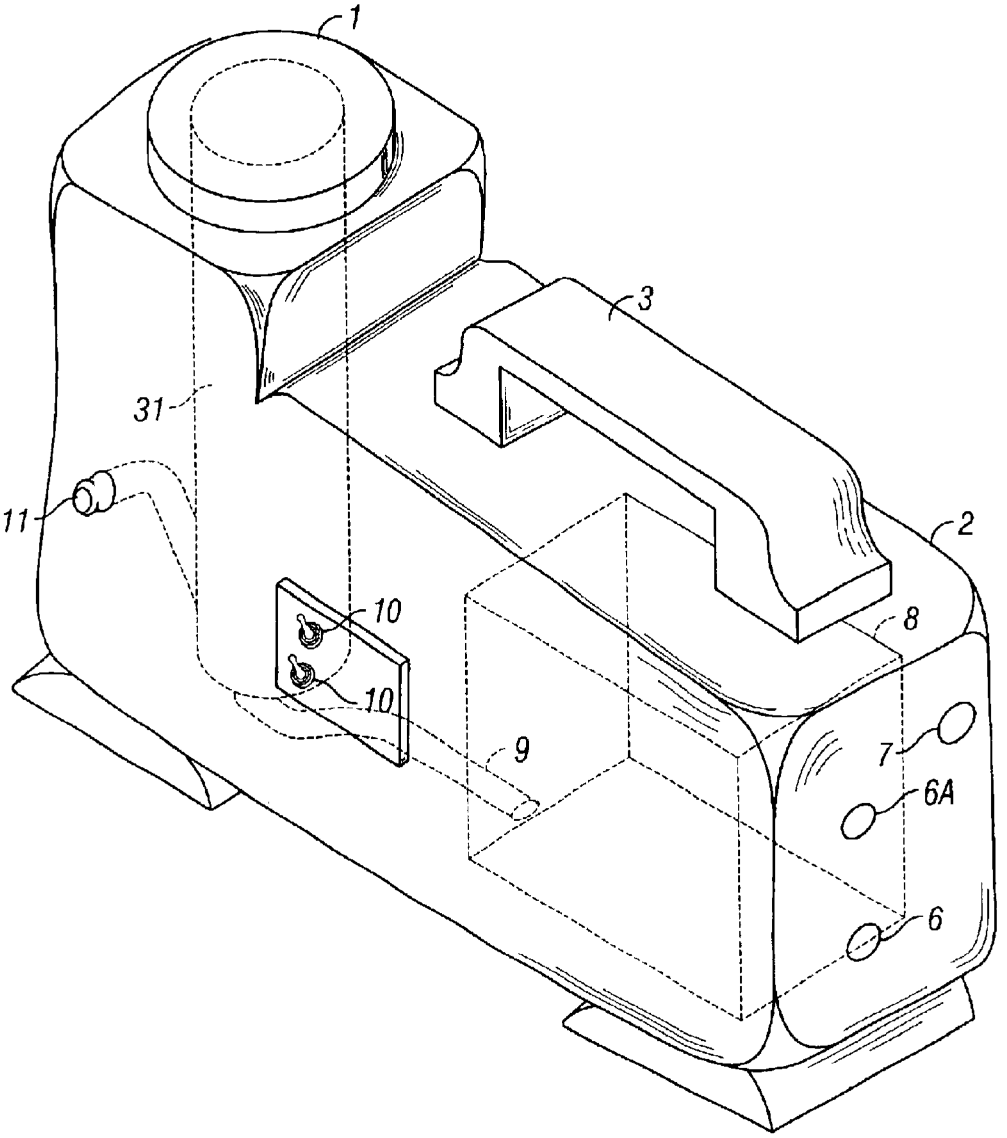
FIG. 2 is a partial cross section view of FIG. 1 showing the internal parts of the apparatus.

FIG. 2 depicts the internal parts of the housing (2). These include an air compressor (8) and a jack (1). The air compressor (8) is preferably electric powered and can preferably be powered by a typical 12 volt automotive electrical system. Again it should be appreciated that the compressor (8) can be of a variety of designs which may be commercially available or custom built. Preferably, the chosen compressor (8) will fit into such a housing (2) as can maintain the portability of the system. The compressor (8) outlet (supply air) can preferably be split into at least two streams (not shown in the figure). The first stream 9 will flow into the bottom of the jack (1). This air stream will then exert pressure to create the hydraulic pressure or pneumatic pressure necessary to move the jack shaft (31) upward and thus lift the desired object. The second air stream will flow to provide air for inflation or for powering pneumatic tools. This second stream my be further split to provide a separate stream for inflation and a separate stream for powering pneumatic tools. Each point of the air stream split (not shown) will preferably be controlled by some type of electronically controlled valve (not shown). Therefore, each stream can be selectively and independently opened or blocked off. An electronic switch module (5) will preferably be used to control the air streams. In one embodiment, the electronic switch module (5) will be able to block or open the air stream to the jack (1), thus lifting or lowering the vehicle or other desired object. The said switch can also block or open the stream to the supply air outlets, thus controlling the supply air for inflation or power for pneumatic tools.

Referring to FIG. 2, the jack (1) is preferably a commercially available jack and is installed within housing (2). The jack (1) is preferably either a hydraulic jack or a pneumatic jack. However, it should be appreciated that one skilled in the particular art could modify an embodiment of this apparatus using a variety of jacks including but not limited to various manual jacks, such as a scissor jack, and pneumatically actuated hydraulic jacks.

Figure 3:
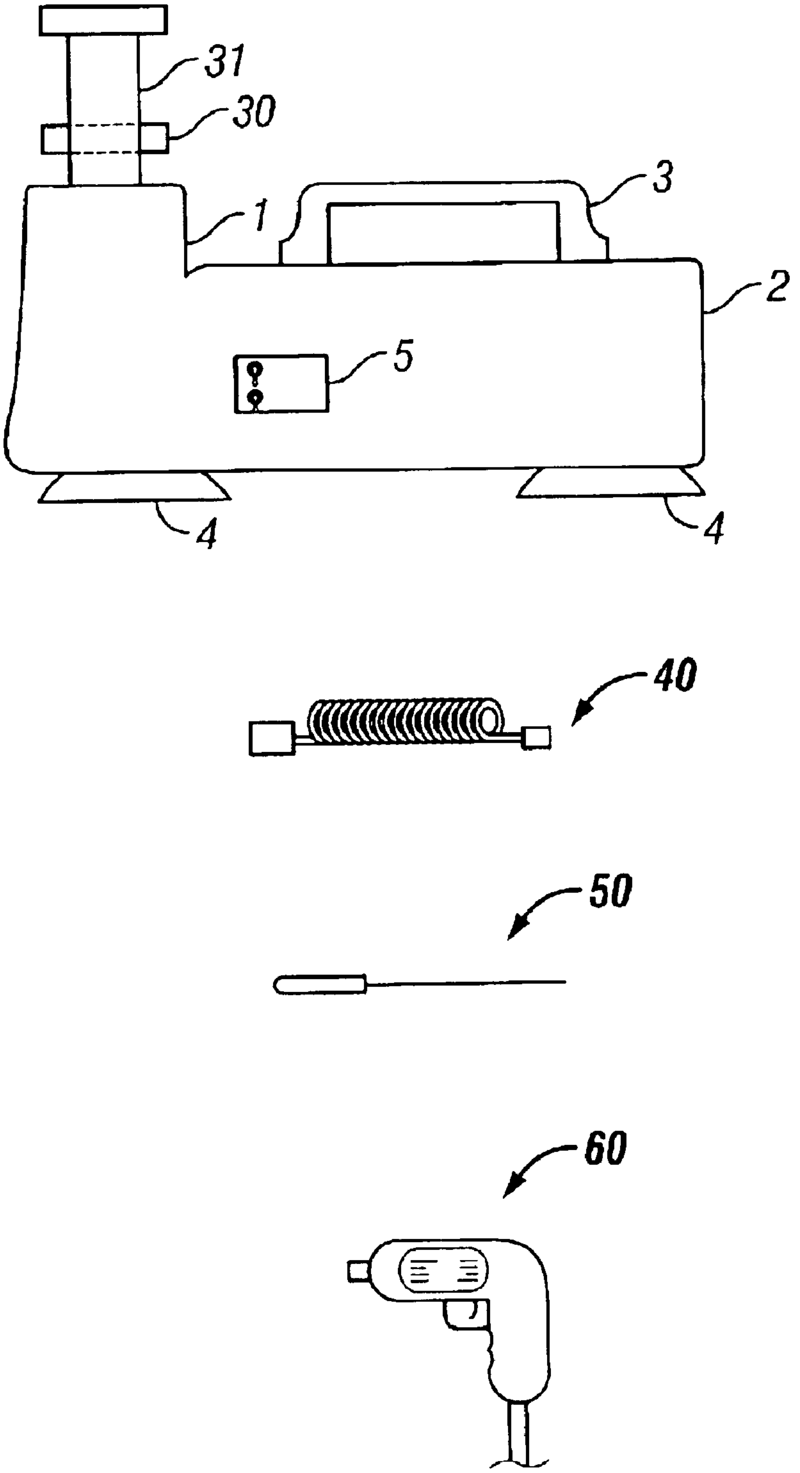
FIG. 3 is a view of an alternative embodiment adapted to prevent inadvertent lowering of the shaft particularly in the case of a hydraulic or air leak.

In use, the compressor can be energized using a standard 12 volt automotive electrical system by attaching the compressor power cord to the vehicle's cigarette lighter or other electrical outlet. It should be appreciated that although the embodiments discussed here primarily contemplate a standard 12 volt DC electrical system for power, the compressor can also be adapted to use a variety of power sources including, but not limited to, standard household currents, batteries and the like. To lift a vehicle or other object, the electronic switch module selector switch (10) would be moved to energize the jack(1). This will allow air, from the compressor (8) to flow to the jack (1). In one embodiment, air, supplied by the compressor (8), will exert air pressure on the hydraulic fluid within the jack (1) and will cause the jack shaft (31) to extend and thus raise the vehicle or other desired object. As represented in FIG. 3, once the vehicle or other desired object is sufficiently raised or the jack shaft (31) has fully extended, a pin, a clamp, or some similarly suitable device 30, can be used to lock the jack shaft (31) in the extended position. This is desirable in case that there is some leak in the air or hydraulic system which would allow pressure within the jack (1) to decrease and no longer support the load of the object being held in the raised position.

Either before raising the vehicle or after the vehicle is raised, the electronic switch module selector switch (10) can be toggled to select the compressor (8) to provide air for a pneumatic wrench which can remove the lug nuts. With the selector switch (10) in this position, it is also possible to inflate a flat tire or other object desired to be inflated. It should be appreciated that this apparatus can be configured with a variety of valves/switches which can direct the compressor air to separate pneumatic hoses for tools or air hoses for inflation/deflation.

In another embodiment, it may be desired to include an optional manual pump 11 to raise or lower the jack (1). This manual option is illustrated in FIG. 3 and could be used in cases where an electrical power source is not available for the compressor (8) or if the compressed air pressure was insufficient to raise a desired object.

Those who are skilled in the art will readily perceive how to modify the present apparatus still further. For example, a variety of power sources can be used to energize the compressor (8), the jack can be actuated mechanically or using fluid power or a combination. Further, the housing framework can be of various configuration and the bottom housing supports can be configured in different ways to provide more stability when lifting vehicles or other objects with the jack portion. In addition, the subject matter of the present apparatus would not be considered limited to a particular material of construction. Therefore, many materials of construction are contemplated by the present apparatus including but not limited to various metals or combinations of metals. As many possible embodiments may be made of the present apparatus without departing from the scope thereof, it is to be understood that all matter herein set forth or shown in the accompanying drawings is to be interpreted as illustrative and not in a limiting sense.

What is claimed is:

1. An apparatus for lifting and providing compressed air comprising:

a jack, an air compressor, an electronic switch, and a framework housing;

said housing comprising a top and bottom side and an outside and inside, wherein a carrying handle is fixedly attached to the top outside and one or more supports are fixedly attached to the bottom outside;

said air compressor and said jack are fixedly attached within said inside of said framework housing;

said air compressor is electrically powered;

said jack is actuated directly by pneumatic power supplied by said air compressor;

said electronic switch, having a first position and a second position;

said first position, of said electronic switch, controllably directs air, from said air compressor, to said jack; and said second position, of said electronic switch, controllably directs air, from said air compressor to a first air supply line, wherein said first supply line is adapted for inflation/deflation and a second air supply line is adapted for pneumatic tools.

2. The apparatus in claim 1, wherein the air compressor is in fluid communication with the jack.

3. The apparatus in claim 1, wherein the air compressor is electrically powered by a vehicle's electrical system.

4. The apparatus in claim 1, wherein said jack can be locked in an extended position.

5. The apparatus in claim 1, wherein the jack is a hydraulic jack.

6. The apparatus in claim 1, wherein the jack and air compressor apparatus comprises a portable and self-contained device.

7. The apparatus in claim 1, wherein the jack is pneumatic jack.

8. The apparatus in claim 1, wherein the jack can be operated by a hand pump.

9. A method for using a portable self contained jack and an air compressor apparatus comprising the steps of:

providing a portable, self-contained jack and air compressor enclosed together in a single housing, having an air supply outlet and an electronic selector switch module having first and second positions;

providing connection access to a vehicle electrical system;

providing an electrical adaptor for connecting said air compressor to said vehicle electrical system;

placing said portable self contained jack and air compressor apparatus underneath an object to be lifted;

electrically energizing said air compressor;

connecting a pneumatic wrench to the air supply outlet;

removing lug nuts;

turning the electronic selector switch to the first position causing the jack to lift the object, wherein the jack is actuated directly by air from said air compressor;

removing a damaged tire and replacing it with an undamaged tire;

replacing the lug nuts and tightening said lug nuts with the pneumatic wrench;

turning the electronic selector switch to the second position causing the jack to lower the object;

electrically de-energizing said air compressor;

disconnecting the air supply outlet to the pneumatic wrench; and removing said portable self contained jack and air compressor apparatus from underneath object to be lifted.

* * * * *